US010279268B2

(12) United States Patent
Woog et al.

(10) Patent No.: US 10,279,268 B2
(45) Date of Patent: May 7, 2019

(54) EXTENSIBLE VIDEO GAME TIME LIMITER

(71) Applicants: Kenneth Mark Woog, Lake Forest, CA (US); Timothy Michael Woog, Aliso Viejo, CA (US)

(72) Inventors: Kenneth Mark Woog, Lake Forest, CA (US); Timothy Michael Woog, Aliso Viejo, CA (US)

( * ) Notice: Subject to any disclaimer, the term of this patent is extended or adjusted under 35 U.S.C. 154(b) by 0 days.

(21) Appl. No.: 15/257,851

(22) Filed: Sep. 6, 2016

(65) Prior Publication Data
US 2017/0065894 A1 Mar. 9, 2017

Related U.S. Application Data

(60) Provisional application No. 62/215,664, filed on Sep. 8, 2015.

(51) Int. Cl.
A63F 13/79 (2014.01)
A63F 13/49 (2014.01)
A63F 13/48 (2014.01)
A63F 13/75 (2014.01)

(52) U.S. Cl.
CPC ............. A63F 13/79 (2014.09); A63F 13/48 (2014.09); A63F 13/49 (2014.09); A63F 13/75 (2014.09)

(58) Field of Classification Search
None
See application file for complete search history.

(56) References Cited

U.S. PATENT DOCUMENTS

| 8,695,028 B2 | 4/2014 | Strickland | |
| 8,881,225 B1 | 11/2014 | Caola | |
| 2006/0152525 A1* | 7/2006 | Woog | G09G 5/003 345/589 |
| 2007/0074284 A1* | 3/2007 | Woog | G06F 21/84 726/16 |
| 2007/0079323 A1* | 4/2007 | Baker | G07F 15/003 725/25 |

(Continued)

OTHER PUBLICATIONS

Microsoft, Set the right limits for your child, Web Site https://support.microsoft.com/en-us/help/12439/microsoft-account-set-child-limits, cited for explanation that Microsoft implements time limit extension requests via email.

(Continued)

Primary Examiner — Tramar Harper

(57) ABSTRACT

A video gaming system includes a motherboard with video display output, a USB and video switching board and a single board computer. The single board computer connects to the front panel power and reset switches, the switching board and the motherboard power switch input. Upon user input to the software program running on the single board computer, a limitations database is accessed. If time is allowed, the program powers the motherboard and switches the USB keyboard and video outputs to the motherboard. During the last minutes of allowed time, the program periodically flashes the display warning the user and, through power and reset switch presses, a time extension can be requested. If allowed, according to the database, use time is extended by the predefined setting. Otherwise time runs out normally and the motherboard is powered off and the USB and video circuits switched back to the single board computer.

1 Claim, 2 Drawing Sheets

(56) References Cited

U.S. PATENT DOCUMENTS

| | | | | |
|---|---|---|---|---|
| 2007/0276517 A1* | 11/2007 | Baker | ............... | G06Q 20/127 700/83 |
| 2007/0276518 A1* | 11/2007 | Baker | ............... | G06Q 20/127 700/83 |
| 2007/0276519 A1* | 11/2007 | Baker | ............... | G06Q 20/127 700/83 |
| 2007/0276520 A1* | 11/2007 | Baker | ............... | G06Q 20/127 700/83 |
| 2008/0079536 A1* | 4/2008 | Palfi | ............... | G04G 15/006 340/5.42 |
| 2009/0011830 A1* | 1/2009 | Wang | ............... | A63F 13/12 463/29 |
| 2011/0236872 A1* | 9/2011 | Taylor | ............... | G06Q 10/06 434/350 |
| 2011/0281643 A1* | 11/2011 | Rioux | ............... | G07C 9/00126 463/29 |

OTHER PUBLICATIONS

PC Magazine, Microsoft Family Safety for Windows 10, Web Site http://www.pcmag.com/slideshow/342148/microsoft-family-safety-for-windows-10/1?backTo=342148, cited for images of how Microsoft implements the requests for time limit extensions.

* cited by examiner

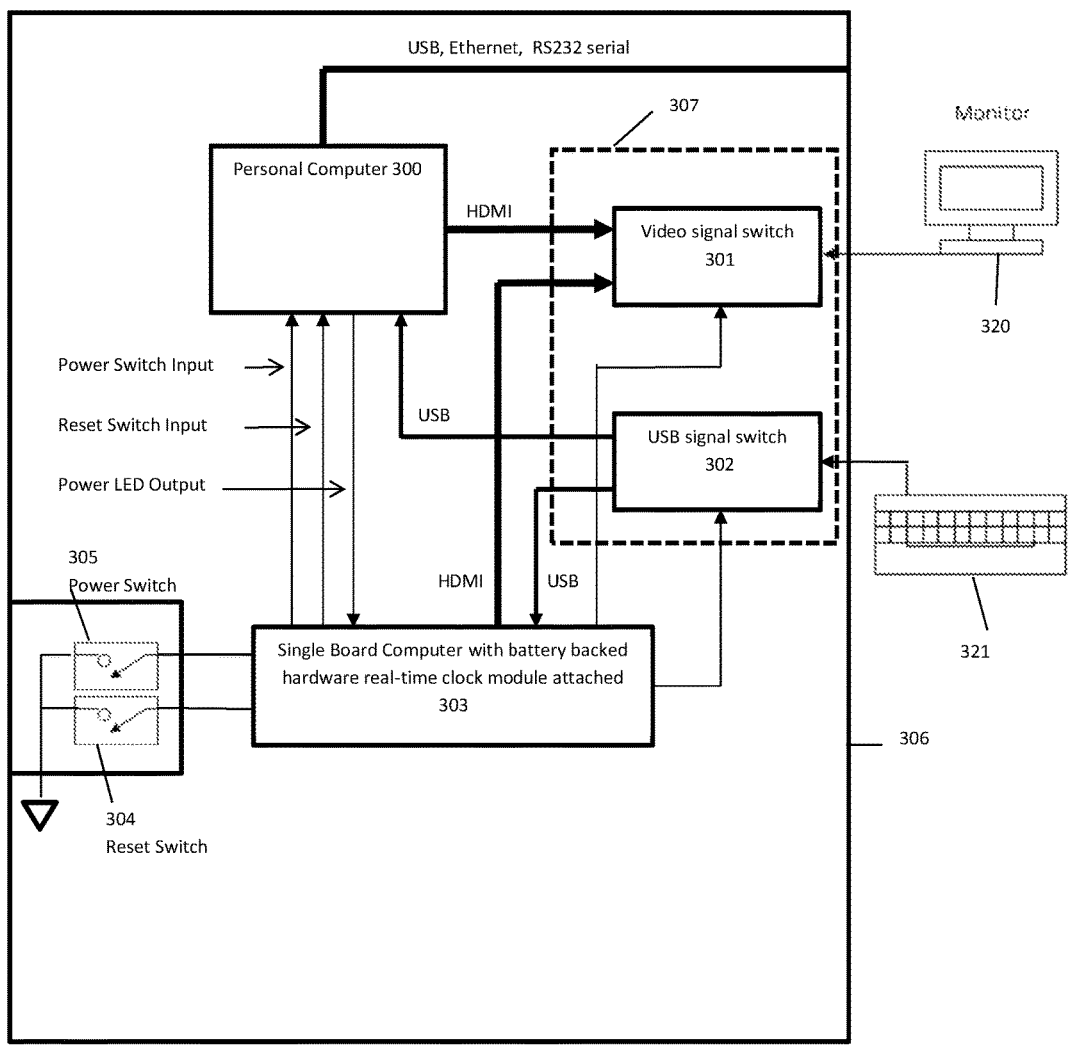
Fig. 1 Hardware Block Diagram

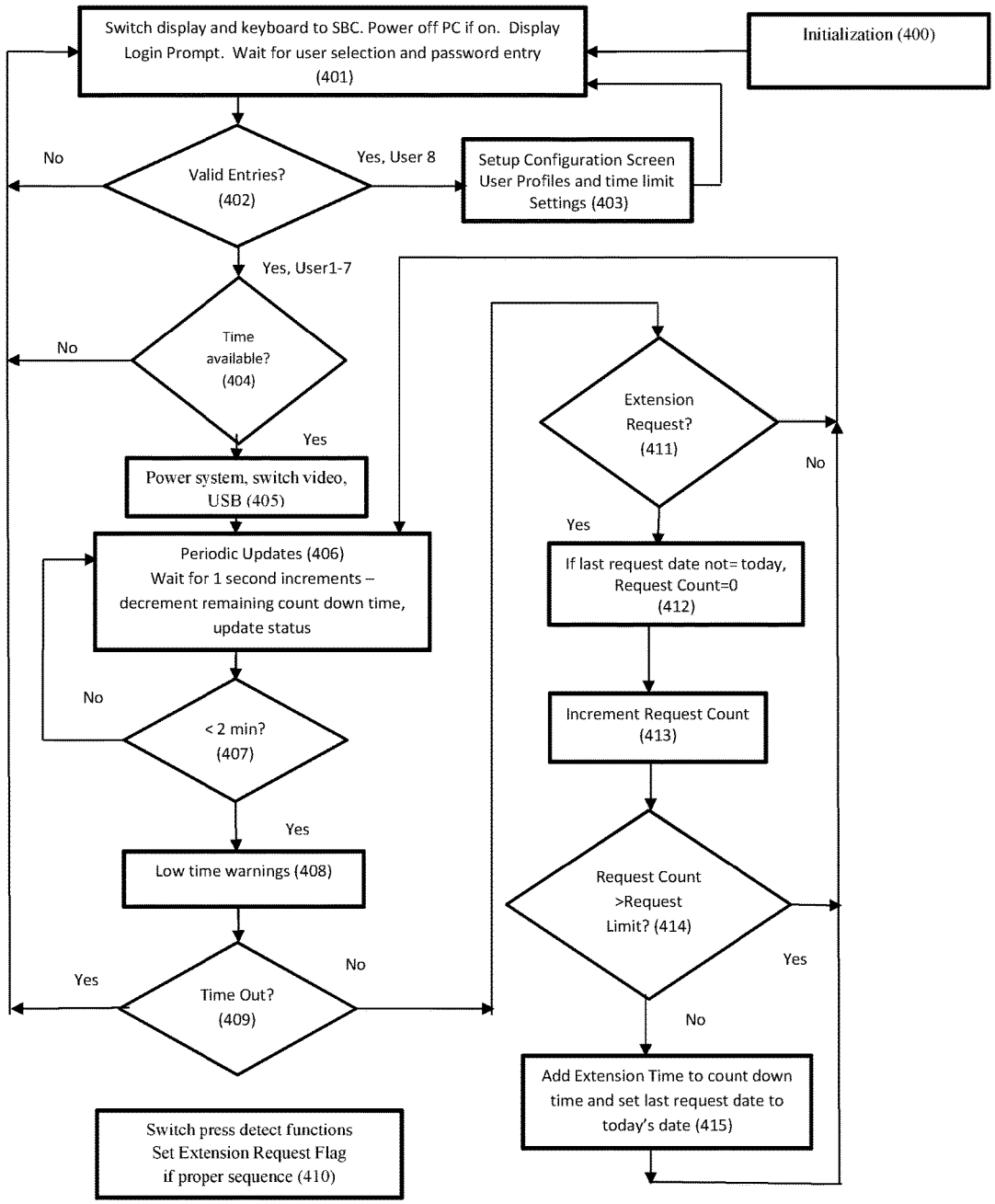
Fig. 2 Time Limit Control Software Flowchart

EXTENSIBLE VIDEO GAME TIME LIMITER

CROSS-REFERENCE TO RELATED APPLICATIONS

This application claims the benefit of U.S. Provisional Application No. 62/215,664, filed Sep. 8, 2015.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable

STATEMENT REGARDING PRIOR DISCLOSURES BY THE INVENTOR OR A JOINT INVENTOR

Not applicable.

BACKGROUND OF THE INVENTION

Parental controls allow a convenient way for parents to enforce usage limits for their children playing video games. Both video game consoles and personal computers provide such parental controls. These controls may be enforced through the game itself, operating system and/or dedicated hardware. While parents may desire to limit when and for how long their children are allowed to play video games, their children may lose track of time while playing and, while playing a multi-player game, have the system shut down or turn off the game in the middle of their play. This not only affects them but also their fellow teammates. Besides the embarrassment, the rules of certain multi-player games do not allow this type of abrupt withdrawal from the game and certain games even sanction players when this happens. Ideally an individual would be mindful of their imposed limits, however many children and adolescents are not able to accurately judge when their access to the game will end. This may be partly because parental controls can be both limited by time of day or amount of hours played. Because of this problem, many parents do not use parental controls but instead ask their child to regulate themselves. They are asked to not start a new game if they believe it will run over their agreed upon limits. This is a challenge for many children and parent-child conflict often results.

BRIEF SUMMARY OF THE INVENTION

The video game system with the parental control features described in this specification provides the unique ability to have usage limits extended in specified increments for a specified number of extensions without disruption of the game in progress and without requiring any form of parental involvement. During the last minutes of authorized game play (or during the last minutes of allowed extensions), the child is notified by on-screen warnings. It is only during this period that extension requests are allowed.

These extensions are requested by the child by physically pressing a combination of buttons/keys. These buttons or keys can be provided on the front panel of the system, touchscreen, gaming controller, mouse, keyboard or separate remote control device. If authorized, the game is extended or if unauthorized, the game/system shuts down as scheduled. Since the child has been made very much aware of the need for extensions, as it required their direct intervention, they will now know that further extension requests to cover the time of another full game will not be available to them. This will make it easier for them to avoid starting another game as they are now aware that there time is limited. The length of the extensions and the number of extensions can be configured to meet the specific needs of the game played.

For example, if the games are 25 minutes in length on average, three 10 minutes extensions will likely suffice. Even if only one extension is used, there will likely not be enough extensions available to complete another game. Of course the child could use the extended time to play a different game of shorter duration. Since the parental control time limits can be set such that these time extensions are included in the total amount of time or time range allowed, the extensions do not necessarily increase or decrease the overall amount of time the child is allowed to play.

BRIEF DESCRIPTION OF THE SEVERAL VIEWS OF THE DRAWINGS

FIG. 1 is a block diagram of the video gaming system with hardware enforced time limits with extension capability FIG. 2 is the software flow chart for the time limit control program running on the single board computer

DETAILED DESCRIPTION OF THE INVENTION

FIG. 1 shows an example embodiment of video gaming system comprising the personal computer 300 and other components mounted inside the metal case 306. Personal computer 300 contains a motherboard with Intel i5 Central Processing Unit (CPU), 8 GB memory, video graphics controller, peripheral device controllers, optical and hard disk drive(s) and power supply. The motherboard of personal computer 300 is modified with the attachment of the +5V standby cable. This +5 v standby cable is a two conductor 20 gauge wire 15" in length with an insulated female socket connector at one end and the other end soldered, on the solder side, to the power signal named +5VSB and ground on the motherboard of personal computer 300. Once soldered in place, the soldered wire connections are covered with a permanent insulating coating.

Personal computer 300 is running Microsoft Windows® 10 operating system which in turn runs device driver software and various applications including games. Although this embodiment includes a personal computer system using an Intel processor with a video graphic controller, the video gaming system could be constructed using a different CPU, video graphics controllers including dedicated microcontrollers, mobile processors or System On Chip (SOC)

devices. It could include CPU types with integrated graphic controllers or a separate graphics controller device. Although this embodiment included the Windows 10 Operating System, those in the art are aware that any operating system capable of running software programs, including dedicated gaming operating systems could be substituted.

The video gaming system also comprises the single board computer (SBC) 303. In this embodiment, SBC 303 is the Raspberry PI Model A+ with a hardware real time clock module connected to general purpose IO (GPIO) signal pins of SBC 303.

SBC 303 also contains a microSD card containing the Linux Debian "Raspian" operating system and programs designed to start up automatically when the computer is plugged into the AC mains. The startup programs are written in bash scripts and the time limit control program is written in Python. The flowchart for this program is provided in FIG. 2. Various program libraries and applications in support of the time limit control software are also installed on the Debian operating system.

SBC 303 gets 5 volt power from the +5 v standby cable attached to the motherboard of personal computer 300. SBC 303 GPIO pins connect to the Power and Reset switch inputs on the motherboard of personal computer 300. This connection allows SBC 303 to turn on and off and reset personal computer 300 as needed to assist in providing hardware enforced time limit control. The power switch 305 and reset switch 304 are mounted to the front panel of case 306 and connect to GPIO pins of SBC 303. These switches are used for both power and reset control and to signal the time extension requests. The switch presses are detected by time limit control software routines that monitor and de-bounce the GPIO signals connected to these switches. Another GPIO pin is connected to the power LED indicator output of the motherboard of personal computer 300. This is used to sense whether personal computer 300 is powered or off.

SBC 3 has HDMI and USB output that connect through cables to the switching circuit board 37 containing the video signal switch 301, the USB signal switch 302 and the associated connectors for internal and external cables. Video signal switch 301 includes the Texas Instruments (TI) TS3DV20812, a 2-Gbps differential switch 8-Bit, 1:2 multiplexer/demultiplexer with 3-side band signals. It is an integrated circuit (IC) with high-speed switching circuits designed for switching HDMI or DVI signals. SBC 303 controls whether the output of video signal switch 301 is selecting the DVI output of personal computer 300 or the HDMI output of SBC 303. Control of video selection is provided through a GPIO pin driving the selection input of video signal switch 301. An HDMI cable connects between the HDMI output of SBC 303 and switching circuit board 37. An HDMI cable connects between the video output of personal computer 300 and switching board 37. An HDMI cable connects between video display monitor 320 and switching circuit board 307 with HMDI connectors open through the outside of case 306 of the video gaming system. Although this embodiment uses an external video display, one skilled in the art could easily see how an internal display could be used instead. This display could be LED, OLED and could also be outfitted with a touchscreen.

In this example embodiment, USB signal switch 302 includes the Texas Instruments SN74CBT3257, 4-bit 1-of-2 FET multiplexer/demultiplexer. USB signal switch 302 selection and enable inputs are driven by GPIO pins of SBC 303. The video gaming system also includes the external USB keyboard 321 connected to the output of USB signal switch 302. USB inputs to USB signal switch 302 are provided by a USB port of personal computer 300 and the USB port of SBC 303. USB cables between personal computer 300 and switching circuit board 307 and another USB cable connects between SBC 303 and switching circuit board 307. Although this design uses an external keyboard, one skilled in the art could easily see how an internal keyboard could be used instead.

Operation

This embodiment uses SBC 303 with dedicated hardware to enforce user authentication, time limit configuration and time limiting operations independent of the operating system running on personal computer 300.

When the video gaming system is plugged into AC Mains, +5 v standby power from personal computer 300 powers SBC 303. With power applied to SBC 303, the CPU on SBC 303, in this embodiment, the Broadcom BCM2835 system on a chip (SoC), begins executing standard code within its silicon. This program initializes certain on chip hardware, memory and then starts the boot loader of Linux OS located on the microSD card plugged into SBC 303. The boot process includes the initialization of systemd, a suite of system management daemons, libraries, and utilities. All the necessary device drivers are initialized by systemd. Near the end of the systemd initialization process, initialization script 41 begins execution with systemd starting pcm.service (/etc/systemd/system/pcm.service). The following is the script for pcm.service:

[Unit]
Description=Starts PCM pi service
After=mod probe.service
[Service]
Type=simple
ExecStart=/usr/bin/PCM/PCM.sh
Restart=always
[Install]
WantedBy=multi-user.target When systemd processes pcm.service, PCM.sh script (/usr/bin/PCM/PCM.sh) is executed. The following is the script PCM.sh:

!/bin/bash
sudo xinit/usr/bin/PCM/PCM4/run-python.sh-- -nocursor
sudo setterm-blank 0-powersave off-powerdown 0
sudo xset s off PCM.sh executes the run-python.sh script inside an x window with sudo (superuser privileges) and the -nocursor (no mouse cursor) parameters (/usr/bin/PCM/PCM4/run-python.sh). The following script is run-python.sh:

!/bin/bash
sudo setterm-blank 0-powersave off-powerdown 0
sudo xset s off
python/usr/bin/PCM/PCM4/GameSnooze.py The run-python.sh script runs the Python interpreter and calls for the start of the time limit control program called "GameSnooze.py" (/usr/bin/PCM/PCM4/GameSnooze.py).

Refer to FIG. 2 for the flow chart of the time limit control program (GameSnooze.py). The program initializes (400), setting up various functions including the GPIO switch detect function (410). This function uses interrupts to cause the routine to be called whenever a switch is pressed. Initialization function (400) loads the extension request dates and counts for each user from files stored on the microSD card of SBC 303. The routine also clears the extension request flag.

The program then proceeds to the login screen function (401) that immediately switches the video and USB outputs to connect external monitor 320 and keyboard 321 respectively to SBC 303. The function further detects whether personal computer 300 is powered by reading the state of the GPIO pin connected to the power LED indicator output of the motherboard of personal computer 300. If it detects personal computer 300 is powered on, the time limit control software pulses the power switch inputs to the motherboard of personal computer 300 using the GPIO pin assigned for that purpose. The function then displays the login screen. From the login screen, a user selects their user number (1-8) and then enters their password. The entries are validated (402) and if found to not be valid, an error message is displayed and the program returns to login screen (401). If the user selected is 8 and the password for user 8 is correct, the program diverts to the setup configuration screen 403. Setup configuration screen 403 provides the user interface to allow configuration of the allowed usage times and profile settings for authorized users of the system and the time/date settings for the hardware real time clock on SBC 303. Keyboard 321 is used to navigate and make setting entries. The following settings are configured from this screen:

1. Allowed time ranges for each user for each day of the week.
2. Allowed daily time limits for each user for each day of the week.
3. Extension limit count—Number of time extensions allowed each day (0-10)
4. Extension time—amount of time extension allowed each extension (in minutes, 1-60)
5. User names, passwords for each user (including User 8).
6. Time/date SBC 303 real time clock hardware The time limit control software stores configuration settings in the time limit/usage database stored on files located on the microSD card with the Debian OS. In addition to storing these additional time limit values, a record containing the date of the most recent extensions granted for each user are also stored. Pressing the "Home" key at any time will automatically save all settings and the program will return to login screen (401).

In this example embodiment, the time limit/usage database is held in machine-readable data storage using files on the microSD card of SBC 303. One in the art could see how this database could be located in other forms such as external flash memory or storage internal to dedicated hardware. Alternatively, with the addition of a WIFI or network adapter connected to SBC 303, time limit settings can be configured on a database located remotely and configured using a web based application.

When a user number 1-7 is entered with the password, it is validated (402). If a valid password has been entered, the program checks to see if time is available for that user (404). If not, the program displays an error message indicating why no time is currently allowed. If time is allowed, the program powers on personal computer 300 by pulsing the power switch input of personal computer 300 and switches the video and USB outputs to personal computer 300 through GPIO signal connected to video signal switch 301 and USB signal switch 302 (405). The routine also sets the amount of time remaining allowed the user into a remaining count down time variable.

The program then waits in the function periodic updates (406). Periodic updates 406, using a periodic one second timer function, decrements the amount of time (in seconds) available each second. During periodic updates (406), once each second the power switch is checked to see if the user wants to power down or if the user has shut down the system using operating system software controls. If the power button has been pressed down for more than 1 second, the program will then set the remaining count down time to zero. The program then continues on to see if time remaining is less than 2 minutes (407). If so, the program then provides a low time visual warning (408) by briefly switching the video on and off. The program then checks to see if time has completely run out (409). If time has run out the program then returns to login screen (401) which will immediately switch the display and USB keyboard and power off the system. Although brief video blanking is used to signal low time, one skilled in the art could see how other means such as audio tones, or video display overlays could be used.

If time has not run out, the program checks to see if an extension request has been made by the user (411). An extension request is initiated when the user depresses power switch 305 quickly followed by pressing reset switch 403 quickly during the last 2 minutes of remaining time available. In this case, pressing the reset switch will not cause SBC 303 to pulse the reset signal of personal computer 300. The routines that detect the switch presses (410) set and clear a flag that is being monitored once per second (411). Although the present embodiment is designed such that time extension requests can only be made during the last 2 minutes of play, other time ranges could be chosen. Further, one skilled in the art could see how to make this value user configurable or to disable this limitation thus allowing the request to be made at any time during or before game play.

If an extension request has been made, the program checks to see if the current date is the same date as stored with the last extension granted (412). If not, then the request counter for that user is cleared. The program then increments the request counter for that user (413) and if the number of requests does not exceed the amount allowed each day (414), the program adds the extension time to the remaining user time (415) and sets the last extension granted (for that user) date to the current date. The extension request count and last extension granted date for each user are stored in files on the microSD card on SBC 303 to ensure persistence should the system be unplugged. Each time an extension is granted the values for that user are updated on the files on the microSD card. Regardless of whether the extension has been granted or not, the routine clears the extension request flag.

The program then returns to periodic updates (406) to wait for the next 1 second periodic timer to occur. When time again runs below 2 minutes remaining (407), the visual warning is provided (408) and the user may now again make another request. If so this is detected (410) and the date is again checked (412) and the request count incremented (413). If the request count is now greater than the allowed number of requests (414) each day, the request is denied and no extension is given and the program returns to periodic update function (406). Once the remaining time expires (409), the program returns to login screen (401) thus switching the USB and video and powering down personal computer 300 by pulsing the power switch signal input to personal computer 300.

Description and Operation of an Alternative Embodiment

Integrate into the Operating System Parental Controls

While the first example embodiment uses dedicated hardware and software to inforce usage limits, one skilled in the art could see how the extension request features could be added to a personal computer operating system or to gaming console parental control software. For both local and remotely configured parental controls, the additional settings could be added to the parental control settings database. If the feature is enabled, the PC operating system or gaming console parental control software can allow time extensions when requested and authorized. A specific combination of keypresses, button presses, mouse clicks or even gaming controller patterns could be used to signal the request. Request for extensions could even be done using Bluetooth devices such as remote controls and smart phones running a custom app. The integration into the operating system could be accomplished by the operating system vendor or alternatively the OS vendor could provide an expanded parental control API so that third parties could easily develop the extension request feature.

Independent Parental Control Software

The previous alternate embodiment would integrate the extension request features into the operating systems or use software conforming to the operating system parental control API. One skilled in the art could envision an alternate embodiment that is completely independent of operating system or parental control APIs. A program or system service, running automatically when the operating system initialized can provide much or all of its own login authentication, user IDs, passwords and all parental control settings. The program would require users to log in before gaining access to the computer and would provide time monitoring and limiting functions independent of the operating system parental control features. This software would be designed and developed the same way independent parental control software programs are developed today.

We claim:

1. A method for monitoring and allowing a qualified request for preset time extensions to a preset time limit for use of a video gaming system, the method comprising:
   a. receiving from a specified user a request to power up and use a the video gaming system on an existing digitally programmed operating system of an electronic device configured for playing video games communicating with a separately programmable video gaming time control system, the request being made through a user login input from a display of a screen for user login provided by a program running on the programmable video gaming time control system, wherein the programmable video gaming time control system which comprises a single board computer having a microprocessor housed within a locked enclosure inaccessible to the specified user;
   b. requesting of a program running on the single board computer having a limitation database permission to power said video gaming system;
   c. determining, via the single board computer, based on limitation settings of the limitation database, whether video gaming system time is currently allowed for the specified user;
   d. if the determined video gaming system time is currently allowed, the single board computer, using general purpose input and output pins, pulsing a power switch input to the existing video game system, switching a video display output to the video gaming system and switching keyboard signals from the single board computer to the video gaming system, or alternately, if the determined video gaming system time is currently not allowed for the specified user, the single board computer displaying an error message,
   e. monitoring, via the single board computer, how much of the video gaming system time is being used on an independently powered timing device communicating with the single board computer, and when there is less than a predetermined amount of the video gaming system time remaining, the single board computer signaling that time is running out through periodic blanking of the video output of the video gaming system;
   f. receiving from the current specified user a request for an automatic extension of allowed time, this request being made through a combination of a front panel power and reset button presses;
   g. determining, via the single board computer, based on limitation settings of the limitation database, whether a number of extension requests exceeds a number of extension requests allowed for the specified user for the current day;
   h. if the number of extension requests exceeds the number allowed as configured in said limitations database, the single board computer, once the allowed video gaming system time for the current specified user login has expired, through signaling on GPIO pins, powering down the video gaming system and switching both video and keyboard outputs back to the single board computer, the program running on the single board computer again displaying a screen for user login; and
   i. alternately if the number of extension requests for the current day does not exceed the number authorized for the current day as configured in the limitations database, the single board computer automatically extending the video gaming system time allowed for the present use of the video gaming system by the amount configured in the database; and
wherein the automatic extension of the video game system time occurs without requiring the intervention of others.

* * * * *